(12) United States Patent
Costello (10) Patent No.: US 7,695,393 B2
(45) Date of Patent: *Apr. 13, 2010

(54) MECHANICAL LAUNCH ASSIST PROPSHAFT ASSEMBLY

(75) Inventor: Scott T. Costello, Royal Oak, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/349,093

(22) Filed: Jan. 6, 2009

(65) Prior Publication Data

US 2009/0114465 A1    May 7, 2009

Related U.S. Application Data

(63) Continuation of application No. 11/368,071, filed on Mar. 3, 2006, now Pat. No. 7,473,204.

(51) Int. Cl.
*F16H 3/74* (2006.01)
*F16H 35/10* (2006.01)
*F16D 7/04* (2006.01)
*B60K 6/00* (2007.10)
*B60K 25/10* (2007.10)
*B60K 8/00* (2006.10)

(52) U.S. Cl. .................. 475/263; 475/257; 464/37; 180/165

(58) Field of Classification Search ............ 475/263, 475/264, 257, 267; 180/165, 298; 464/8–21, 464/37–41, 45–48, 179, 82.1; 903/903
See application file for complete search history.

(56) References Cited

U.S. PATENT DOCUMENTS 3,749,194 A    7/1973    Bandwick

| 4,159,042 A | 6/1979 | Jayner |
| 4,217,970 A | 8/1980 | Chika |
| 4,319,655 A | 3/1982 | Hoppie |
| 4,333,553 A | 6/1982 | Hoppie et al. |
| 4,342,371 A | 8/1982 | Smitley |
| 4,411,171 A | 10/1983 | Fiala |

(Continued)

FOREIGN PATENT DOCUMENTS

DE          8705655         8/1988

(Continued)

OTHER PUBLICATIONS

European Search Report for related Application No. EP 07 75 2112 dated Apr. 14, 2009.

(Continued)

*Primary Examiner*—Tisha D Lewis
(74) *Attorney, Agent, or Firm*—Harness, Dickey & Pierce, P.L.C.

(57) ABSTRACT

A propeller shaft and energy storage assembly includes a first power transfer mechanism for selectively drivingly interconnecting the propeller shaft and an energy storage device to store energy within the energy storage device. A second power transfer mechanism is operable to selectively retain and release energy stored within the energy storage device. A third power transfer mechanism selectively drivingly interconnects the energy storage device and the propeller shaft when vehicle acceleration is desired.

20 Claims, 5 Drawing Sheets

U.S. PATENT DOCUMENTS

| | | |
|---|---|---|
| 4,423,794 A | 1/1984 | Beck |
| 4,471,668 A | 9/1984 | Elsner |
| 4,479,356 A | 10/1984 | Gill |
| 4,531,719 A | 7/1985 | Hoppie et al. |
| 4,813,509 A | 3/1989 | Harris |
| 5,014,837 A | 5/1991 | Kaari |
| 6,024,667 A | 2/2000 | Krohm et al. |
| 6,138,527 A | 10/2000 | Bitterly et al. |

FOREIGN PATENT DOCUMENTS

| | | |
|---|---|---|
| GB | 2346193 A | 2/2000 |
| JP | 55156724 | 5/1979 |
| JP | 11210485 | 1/1998 |

OTHER PUBLICATIONS

European Patent Office Office Action dated Aug. 3, 2009.

MECHANICAL LAUNCH ASSIST PROPSHAFT ASSEMBLY

CROSS-REFERENCE TO RELATED APPLICATIONS

This application is a continuation of U.S. patent application Ser. No. 11/368,071 filed on Mar. 3, 2006, now U.S. Pat. No. 7,473,204. The entire disclosure of the above application is incorporated herein by reference.

BACKGROUND AND SUMMARY OF THE INVENTION

The present invention generally relates to an energy storage device for a vehicle and, more particularly, to a propeller shaft and energy storage assembly.

In view of recent events, fuel economy for automotive vehicles has become of great importance. Environmental concerns and governmental emissions regulations are also becoming pressing issues for automobile manufacturers. These and other considerations have driven manufacturers of automotive vehicles to consider alternate fuel sources such as solar power, fuel cells and natural gas. Battery powered and hybrid vehicles combining various power transmission techniques are also among a host of other concepts being evaluated.

Some vehicle manufacturers have also addressed the energy efficiency challenge by creating vehicles that weigh less and more efficiently cut through the air as they travel. While many of these devices and concepts have merit, opportunities exist for alternate designs.

One solution presently contemplated includes a propeller shaft and energy storage assembly having a propeller shaft with a first end adapted to be drivingly coupled to an engine and a second end adapted to be drivingly coupled to a driven wheel. The propeller shaft and energy storage assembly includes a first power transfer mechanism for selectively drivingly interconnecting the propeller shaft and an energy storage device when a vehicle is moving forward. A second power transfer mechanism is operable to selectively retain and release energy stored within the energy storage device. A third power transfer mechanism selectively drivingly interconnects the energy storage device and the propeller shaft when vehicle acceleration is desired. The release of the stored energy through the propeller shaft then assists the engine or other power source in accelerating the vehicle.

Another propeller shaft and energy storage assembly includes a propeller shaft having a first end adapted to be drivingly coupled to an engine and a second end adapted to be drivingly coupled to a driven wheel. The propeller shaft and energy storage assembly includes a first clutch selectively operable to drivingly interconnect the propeller shaft and a spring to store energy in the spring, a second clutch operable to restrict movement of the spring to retain the stored energy within the spring and a third clutch operable to selectively drivingly couple the spring and the propeller shaft to transfer the stored energy through the propeller shaft.

Furthermore, a method of storing and releasing energy in a vehicle including an engine drivingly coupled to a driveline where the driveline has a propeller shaft and an energy storage device is disclosed. The method includes placing the vehicle in motion and drivingly coupling the propeller shaft to the energy storage device to transfer energy from the moving vehicle to the energy storage device. The method also includes de-coupling the propeller shaft from the energy storage device and retaining the stored energy in the energy storage device. The energy from the energy storage device is then transferred to the propeller shaft by drivingly coupling the energy storage device with the propeller shaft to assist in accelerating the vehicle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
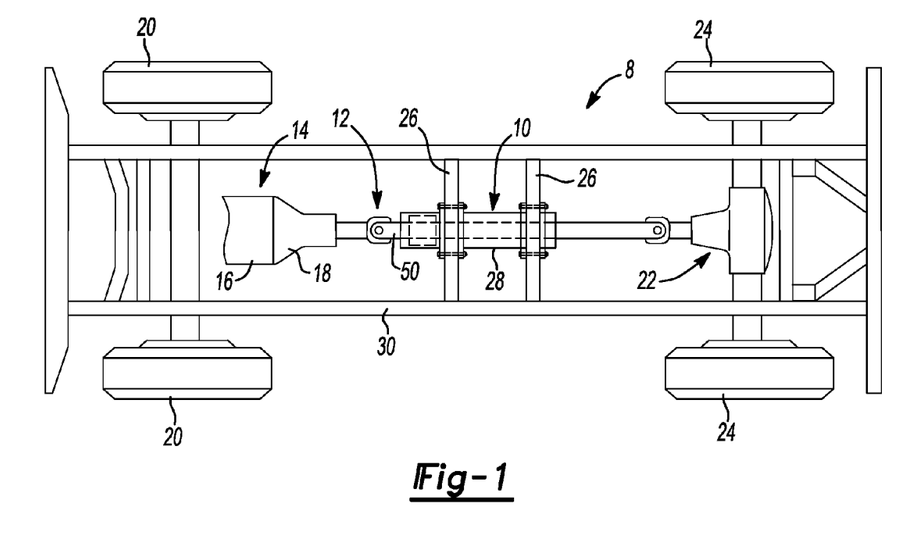
FIG. 1 is a schematic depicting an exemplary rear wheel drive vehicle having a driveline equipped with a propeller shaft and energy storage assembly.

With reference to FIG. 1, an exemplary vehicle 8 includes a propeller shaft and energy storage assembly 10. Vehicle 8 includes a driveline 12 which is drivable via a connection to a powertrain 14. The powertrain 14 includes an engine 16 and a transmission 18. The driveline 12 includes propeller shaft and energy storage assembly 10, a rear axle 22, a pair of front wheels 20 and a pair of rear wheels 24. Engine 16 is mounted in an in-line or longitudinal orientation along the axis of vehicle 8 and its output is selectively coupled via a conventional clutch to the input of the transmission 18 to transmit rotary power therebetween. The input of the transmission 18 is commonly aligned with the output of the engine 16 for rotation about a rotary axis. The propeller shaft and energy storage assembly 10 is coupled with an output member of transmission 18. Drive torque is transmitted through the propeller shaft and energy storage assembly 10 to the rear axle 22 where it is selectively apportioned in a predetermined manner to the left and right rear wheels 24. Support brackets 26 mount a housing 28 of propeller shaft and energy storage assembly 10 to a frame 30 of vehicle 8.

Figure 2:
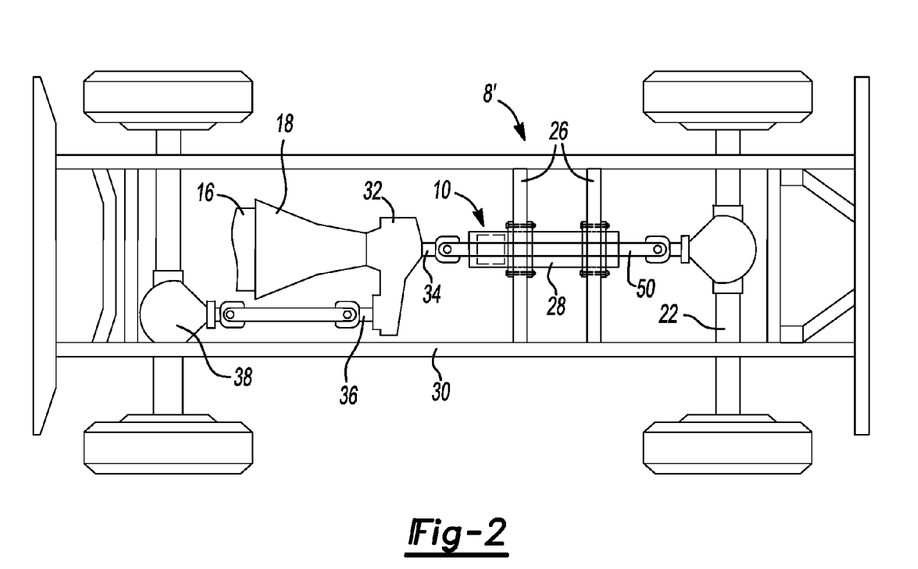
FIG. 2 is a schematic depicting an exemplary all wheel drive vehicle having an alternate driveline arrangement including the propeller shaft and energy storage assembly.

FIG. 2 depicts an alternate embodiment all wheel drive vehicle 8' configured substantially similarly to vehicle 8 except that a transfer case 32 is positioned within the driveline between transmission 18 and propeller shaft and energy storage assembly 10. Transfer case 32 has a first output shaft 34 drivingly coupling engine 16 with rear axle assembly 22.

Transfer case 32 also has a second output shaft 36 drivingly coupling engine 16 with a front drive axle 38.

Figure 3:
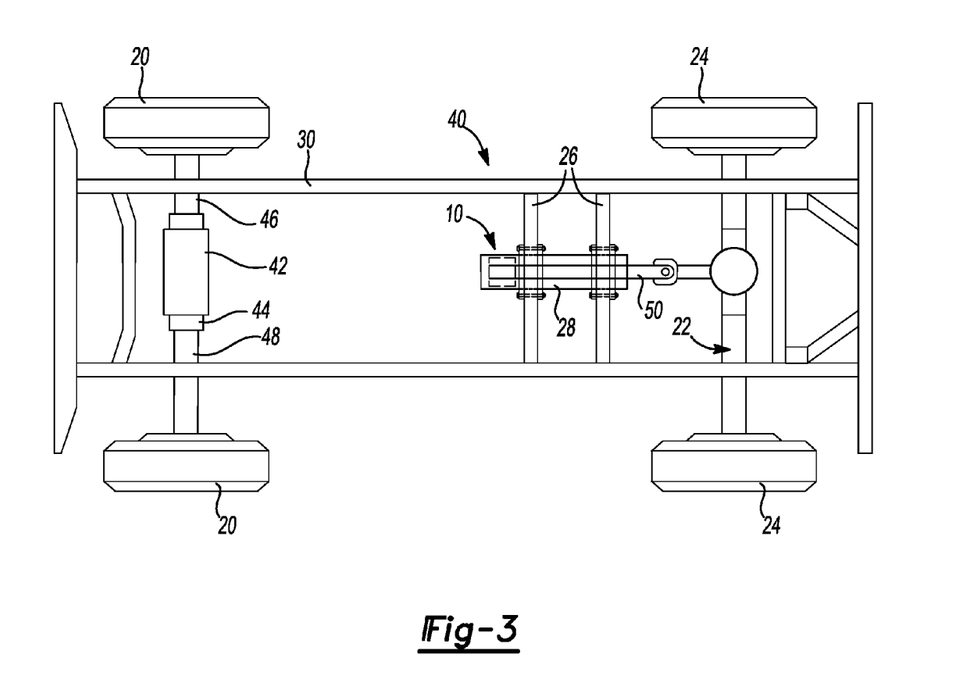
FIG. 3 is a schematic depicting an exemplary front wheel drive vehicle having an alternate driveline arrangement including the propeller shaft and energy storage assembly.

FIG. 3 depicts an alternate embodiment front wheel drive vehicle 40. Vehicle 40 includes a transversely oriented engine 42 drivingly coupled to a transmission 44. The output of transmission 44 is aligned with input stub shafts 46 and 48 such that torque is transferred from engine 42 to a pair of driven front wheels 20. Vehicle 40 is otherwise substantially similar to vehicle 8 and vehicle 8'. Accordingly, like elements will retain their previously introduced reference numerals. However, it should be appreciated that the rear axle 22 of vehicle 40 may be substantially downsized when compared to the rear drive axles of vehicles 8 and 8' because engine torque is not directly transferred to the rear axle of vehicle 40. On the contrary, rear axle 22 is only driven via propeller shaft and energy storage assembly 10 during certain modes of operation as will be described in greater detail hereinafter. Therefore, a substantial cost and weight savings may be realized through the use of smaller and lighter driveline and drive axle components.

Figure 4:
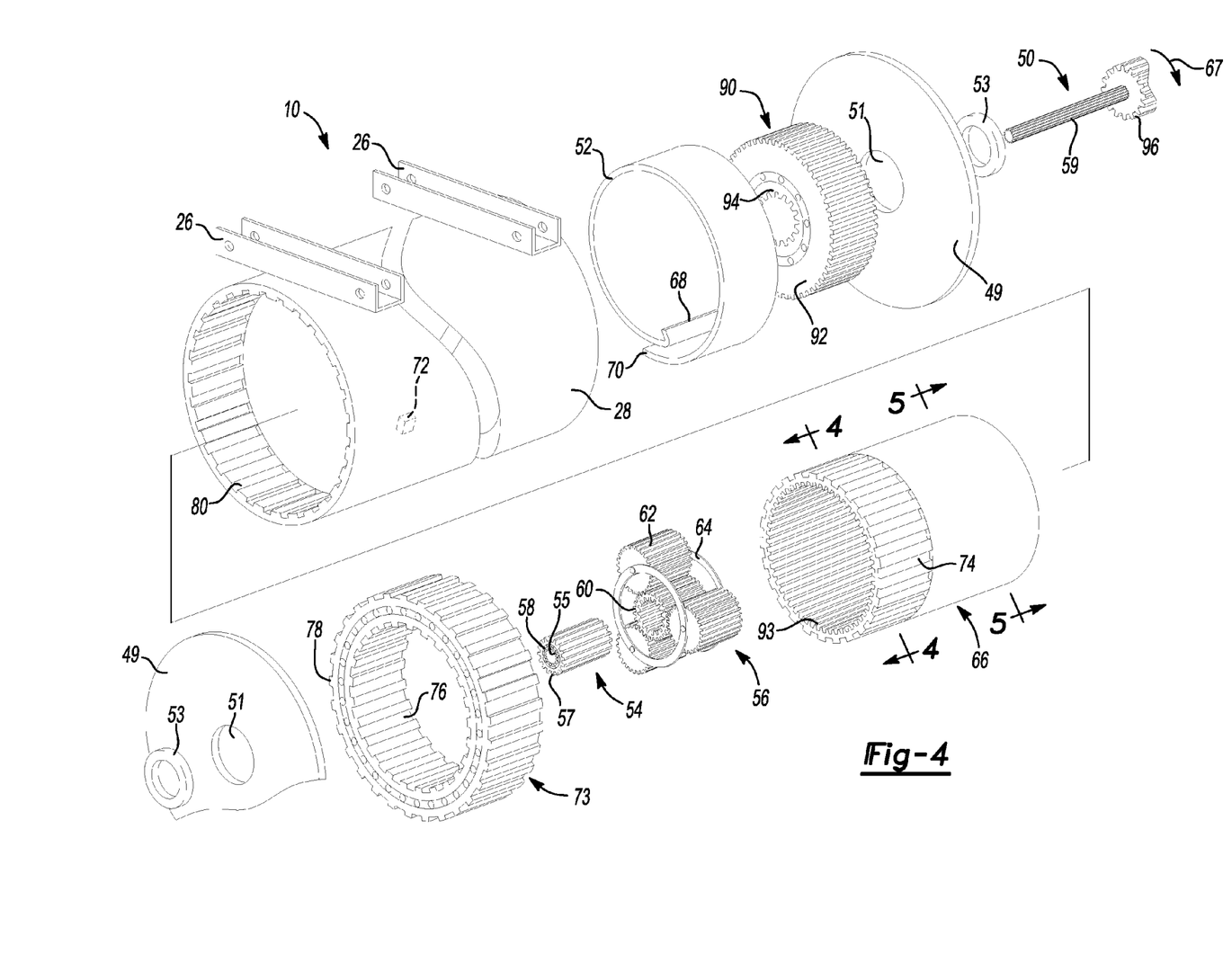
FIG. 4 is an exploded perspective view of the propeller shaft and energy storage assembly.
Figure 5:
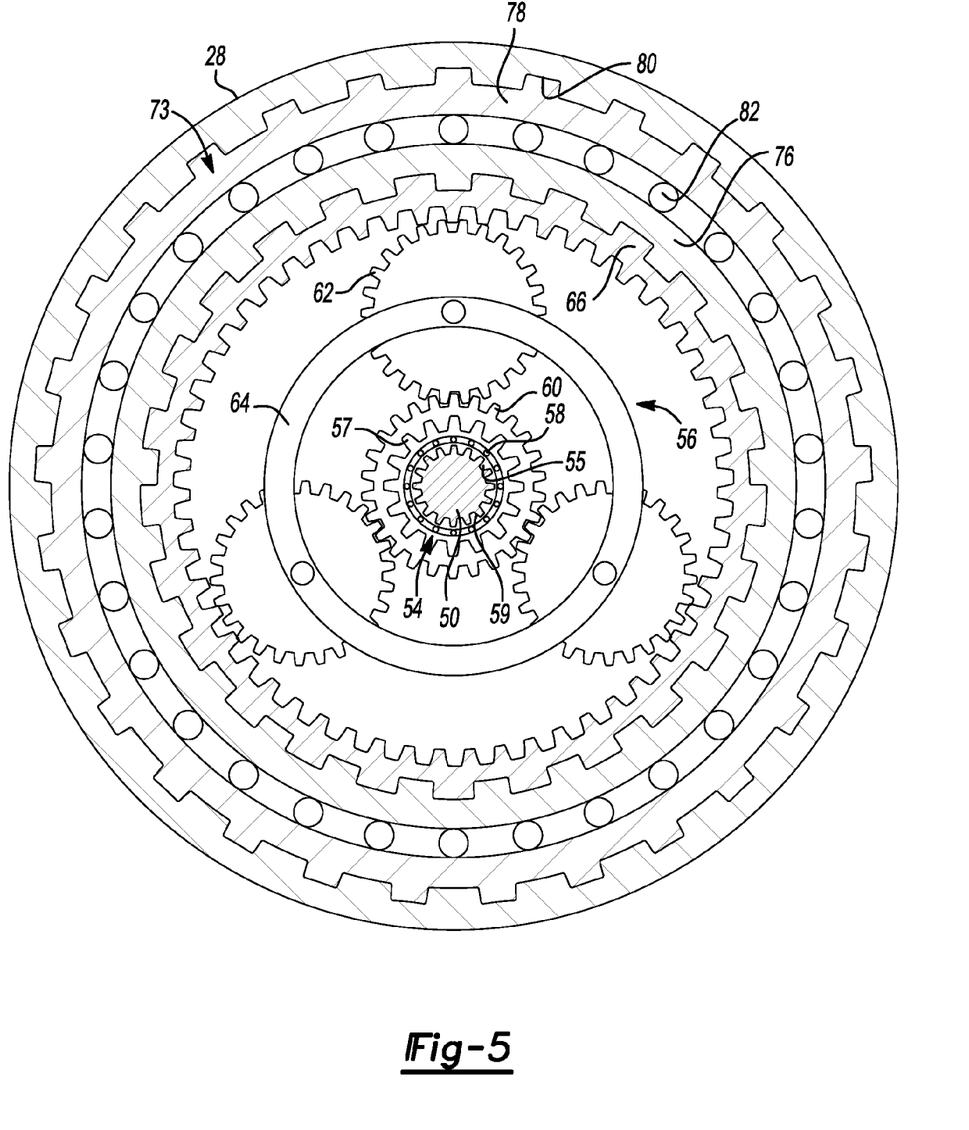
FIG. 5 is a cross-sectional view of the propeller shaft and energy storage assembly taken along line 4-4 as shown in FIG. 4.
Figure 6:
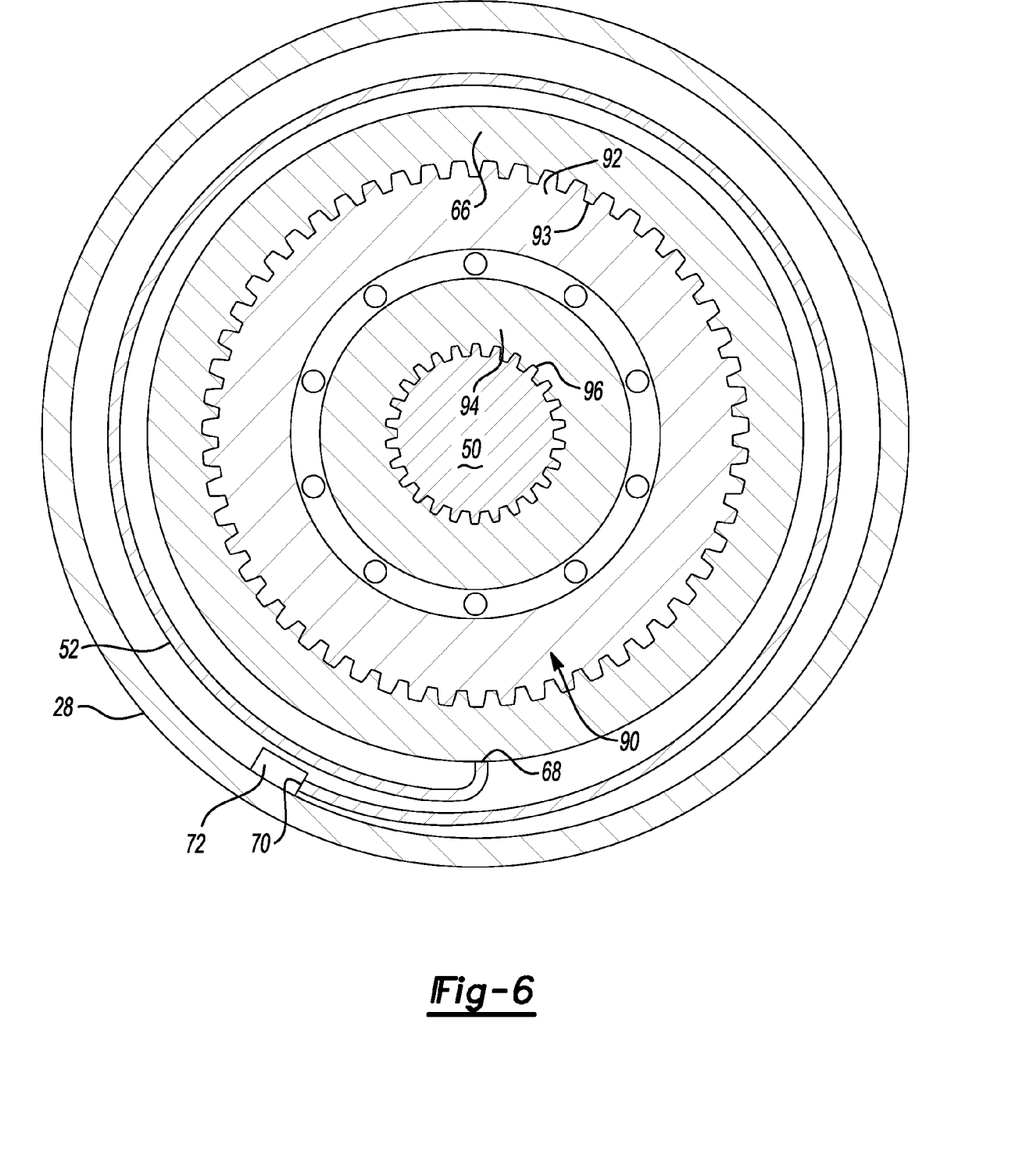
FIG. 6 is a cross-sectional view of the propeller shaft and energy storage assembly taken along line 5-5 as shown in FIG. 4.

FIGS. 4-6 depict propeller shaft and energy storage assembly 10 in greater detail. Propeller shaft and energy storage assembly 10 is selectively operable in an energy storage mode where energy may be transferred from a propeller shaft 50, also known as a propshaft or driveshaft, to an energy storage device such as a spring 52. The propeller shaft and energy storage assembly 10 is also operable in an energy retention mode where energy stored within spring 52 is retained for later introduction into the driveline. Propeller shaft and energy storage assembly 10 is operable in an energy release mode where energy stored within spring 52 is transferred to propeller shaft to accelerate vehicle 8. During all modes of operation of the propeller shaft and energy storage assembly 10, propeller shaft 50 continuously drivingly interconnects rear axle 22 and transmission 18. Propeller shaft 50 passes through housing 28 to accomplish this task.

Front and rear cover plates 49 cover openings formed at each end of housing 28. Each cover plate 49 includes an aperture 51 extending through the plate. Propeller shaft 50 extends through each aperture 51. Seals 53 sealingly engage portions of propeller shaft 50 to protect the components placed within housing 28 from contamination.

During the energy storage mode of operation, a first torque path is utilized. The first torque path includes propeller shaft 50, a first clutch 54, a planetary gearset 56 and spring 52. Torque may be selectively transferred along the first torque path during vehicle forward motion while the propeller shaft and energy storage assembly 10 operates in the energy storage mode. While it is possible to enter the energy storage mode while vehicle 40 is being powered by engine 16, it is more likely that the energy storage mode will be entered when the vehicle operator is not requesting torque supply from engine 16. A driver requested deceleration is an example of one such vehicle operating condition where the throttle position is closed and a brake pedal is depressed. Another possible time to enter the energy storage mode is during coasting when the throttle position is closed and the brakes are not being applied.

First clutch 54 includes an inner race 55, an outer race 57 and a plurality of balls 58 positioned between inner race 55 and outer race 57. First clutch 54 is operable to allow inner race 55 to rotate relative to outer race 57 in a disengaged mode. First clutch 54 is also operable in an engaged mode where relative rotation between inner race 55 and outer race 57 is restricted. Inner race 55 is in splined engagement with an external spline 59 formed on a portion of propeller shaft 50. Outer race 57 is in splined engagement with a sun gear 60 of planetary gearset 56. During the energy storage mode of operation, first clutch 54 is engaged to transfer torque from propeller shaft 50 to sun gear 60 of planetary gearset 56. Planetary gearset 56 also includes three pinion gears 62 rotatably supported by a carrier 64. A ring gear 66 is formed as an elongated, hollow substantially cylindrical member. Pinion gears 62 are in driving meshing engagement with sun gear 60 and ring gear 66. When first clutch 54 is engaged, rotation of propeller shaft 50 in a first direction as indicated by an arrow 67 causes ring gear 66 to rotate in an opposite direction.

Spring 52 is a torsion spring shown in a "free" state in FIG. 4. Spring 52 may be deflected by being wound or unwound from the free state to store energy. Spring 52 has a first end 68 mounted to ring gear 66 and a second end 70 mounted to housing 28. A projection 72 provides an attachment point for mounting spring 52 to housing 28. Accordingly, when ring gear 66 rotates, spring 52 is deflected to store energy.

Once spring 52 has been deflected, propeller shaft and energy storage assembly 10 is operated in the energy retention mode. At this time, a second clutch 73 is actuated to retain the energy stored within spring 52. Torque travels along a second path to maintain the deflected position of coil spring 52 and store energy. Specifically, ring gear 66 includes an externally splined portion 74 drivingly engaged with an inner race 76 of second clutch 73. Second clutch 73 includes an outer race 78 having an external spline drivingly engaged with an internal spline 80 formed on housing 28. A plurality of balls 82 (FIG. 5) are positioned between inner race 76 and outer race 78. Housing 28 is mounted to frame 30 and is restricted from rotation. While second clutch 73 is engaged, relative movement between inner race 76 and outer race 78 is restricted. Therefore, relative movement between ring gear 66 and housing 28 is also restricted. Accordingly, the deflected position of spring 52 is maintained. During the energy retention mode, first clutch 54 is released to allow propeller shaft 50 to continue to rotate in direction 67. During this mode of operation, torque is transferred from engine 16 to rear axle 22 without interaction between propeller shaft 50 and the energy storage portion of propeller shaft and energy storage assembly 10.

At an appropriate time such as at vehicle launch, the energy release mode is entered. During the energy release mode, a third path transfers torque from spring 52 to propeller shaft 50. Specifically, second clutch 73 is released to allow relative rotation between ring gear 66 and housing 28. A third clutch 90 is engaged to provide a path for torque to flow from the ring gear 66 to propeller shaft 50. Third clutch 90 includes an outer race 92 in driving engagement with inner teeth 93 formed on ring gear 66. Third clutch 90 includes an inner race 94 in driving engagement with an outer splined portion 96 of propeller shaft 50. It should be appreciated that during the energy release mode, ring gear 66 rotates in the same direction as propeller shaft 50 in direction 67. Accordingly, propeller shaft and energy storage assembly 10 is operable to transfer energy from propeller shaft 50 while vehicle 8 is traveling in a forward direction and propeller shaft 50 rotates in direction 67. Energy may be transferred from spring 52 into propeller shaft 50 while the vehicle is stopped or traveling in a forward direction. Energy may be stored while the vehicle is stopped or traveling in either forward or reverse.

The description of the invention is merely exemplary in nature and variations are not to be regarded as a departure from the spirit and scope of the invention. For example, a planetary gearset need not be present in the propeller shaft and energy storage assembly to provide the described functions. Furthermore, energy storage devices other than torsion springs are contemplated as being within the scope of the invention.

What is claimed is:

1. A driveline for use in a motor vehicle to interconnect a powertrain and an axle assembly, comprising:
a shaft having a first end coupled to the powertrain and a second end coupled to the axle assembly; and
an energy storage device including a non-rotary housing surrounding a portion of said shaft, a gearset having an input member and an output member, a spring disposed between said shaft and said housing and having a first end coupled to said output member and a second end coupled to said housing, a first clutch selectively operable to couple said spring to said shaft for storing energy in said spring, a second clutch selectively operable to restrict movement of said spring to retain stored energy in said spring, and a third clutch selectively operable to couple said spring to said shaft to release stored energy for driving said shaft, wherein said first clutch is operable for releaseably coupling said input member to said shaft for causing said output member to wind said spring relative to said housing, wherein said second clutch is operable for releaseably coupling said output member to said housing for maintaining said spring in its wound condition, and wherein said third clutch is operable for releaseably coupling said output member to said shaft.

2. The driveline of claim 1 wherein an energy storage mode is established when said first clutch is engaged and said second and third clutches are released such that rotation of said shaft in a first direction causes said output member to wind said spring in a second direction.

3. The driveline of claim 2 wherein an energy retention mode is established when said second clutch is engaged and said first and third clutches are released such that said input member is uncoupled from said shaft and said output member is coupled to said housing for maintaining said spring in its wound condition.

4. The driveline of claim 3 wherein an energy release mode is established when said third clutch is engaged and said first and second clutches are released such that said output member is coupled to said shaft and said spring is permitted to unwind by rotating in said first direction for transferring stored energy to said shaft.

5. The driveline of claim 1 wherein said first, second and third clutches are all disposed between said shaft and said housing.

6. A driveline assembly in a motor vehicle interconnected between a powertrain and an axle assembly, comprising:
a propeller shaft for transferring rotary power from the powertrain to the axle assembly; and
an energy storage device including a non-rotary housing surrounding a portion of said propeller shaft, a gearset having an input member and an output member, a spring having a first end secured to said output member and a second end secured to said housing, a first clutch operable for selectively coupling said input member to said propeller shaft for winding said spring relative to said housing so as to store energy in said spring, a second clutch operable for selectively coupling said output member to said housing for restricting movement of said spring relative to said housing for maintaining said spring in a wound condition so as to retain stored energy in said spring, and a third clutch operable for selectively coupling said output member to said propeller shaft for permitting said spring to unwind and transfer stored energy to said propeller shaft.

7. The driveline assembly of claim 6 wherein said gearset is a planetary gearset having a sun gear as said input member, a ring gear as said output member, and pinion gears rotatably supported by a carrier and which are meshed with said sun gear and said ring gear.

8. The driveline assembly of claim 7 wherein said first clutch is a first overrunning clutch disposed between said propeller shaft and said sun gear.

9. The driveline assembly of claim 8 wherein said second clutch is a second overrunning clutch disposed between said ring gear and said housing.

10. The driveline assembly of claim 9 wherein said third clutch is a third overrunning clutch disposed between said ring gear and said propeller shaft.

11. The driveline assembly of claim 6 wherein an energy storage mode is established when said first clutch is engaged and said second and third clutches are released such that rotation of said propeller shaft in a first direction causes said output member to wind said spring in a second direction.

12. The driveline assembly of claim 6 wherein an energy retention mode is established when said second clutch is engaged and said first and third clutches are released such that said input member is uncoupled from said propeller shaft and said output member is coupled to said housing for maintaining said spring in its wound condition.

13. The driveline assembly of claim 6 wherein an energy release mode is established when said third clutch is engaged and said first and second clutches are released such that said output member is coupled to said propeller shaft and said spring is permitted to unwind by rotating in said first direction for transferring stored energy to said propeller shaft.

14. The driveline assembly of claim 6 wherein said first clutch is a first overrunning clutch disposed between said propeller shaft and said input member of said gearset, wherein said second clutch is a second overrunning clutch disposed between said housing and said output member of said gearset, and wherein said third clutch is a third overrunning clutch disposed between said propeller shaft and said output member of said gearset.

15. The driveline assembly of claim 6 wherein said gearset is concentrically disposed between said propeller shaft and said housing, and wherein said spring surrounds said gearset such that its first end is coupled to said output member of said gearset and its second end is coupled to said housing.

16. The driveline assembly of claim 15 wherein said first clutch is concentrically disposed between said propeller shaft and said input member of said gearset, and wherein said second clutch is concentrically disposed between said output member of said gearset and said housing.

17. A driveline assembly in a motor vehicle interconnected between a powertrain and an axle assembly, comprising:
a shaft having a first end coupled to the powertrain and a second end coupled to the axle assembly; and
an energy storage assembly including a non-rotary housing concentrically surrounding an intermediate portion of said shaft, a gearset coaxially disposed between said shaft and said housing and having an input member and an output member, a spring surrounding said gearset and having a first end coupled to said output member and a second end coupled to said housing, a first clutch operable for selectively coupling said input member to said shaft, a second clutch operable for selectively coupling said output member to said housing, and a third clutch operable for selectively coupling said output member to said shaft.

18. The driveline assembly of claim 17 wherein an energy storage mode is established when said first clutch is engaged and said second and third clutches are released such that rotation of said shaft in a first direction causes said output member to wind said spring in a second direction, wherein an energy retention mode is established when said second clutch is engaged and said first and third clutches are released such that said input member is uncoupled from said shaft and said output member is coupled to said housing for maintaining said spring in its wound condition, and wherein an energy release mode is established when said third clutch is engaged and said first and second clutches are released such that said output member is coupled to said shaft and said spring is permitted to unwind by rotating in said first direction for transferring stored energy to said shaft.

19. The driveline assembly of claim 17 wherein said first clutch is a first overrunning clutch disposed between said shaft and said input member of said gearset, wherein said second clutch is a second overrunning clutch disposed between said housing and said output member of said gearset, and wherein said third clutch is a third overrunning clutch disposed between said shaft and said output member of said gearset.

20. The driveline assembly of claim 17, wherein said gearset is a planetary gearset having a sun gear as its input member, a ring gear as its output member, and a carrier supporting pinion gears meshed with both of said sun and ring gears, wherein said first clutch is operable to releaseably couple said sun gear for rotation with said shaft and wherein said third clutch is operable to releaseably couple said ring gear of rotation with said shaft.

* * * * *